Patented May 17, 1932

1,858,745

UNITED STATES PATENT OFFICE

ANTON MACKERT, OF FRANKFORT-ON-THE-MAIN, GERMANY

PROCESS FOR THE REACTIVATION OF POWDERED OR FINE-GRAINED ADSORPTIVE CARBON

No Drawing. Application filed May 28, 1929, Serial No. 366,766, and in Germany and Austria June 8, 1928.

It is known that powdered or fine-grained adsorption carbon, such as that used for decolorizing purposes, can be reactivated by heating the same in a powdered condition in the presence of activating gases, the particles of carbon being continuously intermingled or kept in a state of suspension in the gaseous atmosphere during the reactivation process.

According to the present invention, powdered or fine-grained adsorption carbon, or a mixture of same with other adsorption agents, such as Fuller's earth, is reactivated by first of all transforming the powdered or fine-grained material into molded bodies which are then subjected to heat treatment in a gaseous medium. The shaping into blocks can be carried out, for example with the aid of filter presses, extrusion presses or similar devices, suitable organic or inorganic binding media being employed on occasion. The addition of binding media is generally unnecessary, since the impurities present on the carbon suffice to impart sufficient cohesion to the molded bodies. This holds good among others for the spent active carbon from sugar refineries.

The molded bodies, e. g. filter cakes, can be broken into pieces of suitable size, which are subjected to the reactivation treatment hereinafter described. In certain cases, however, the whole filter cakes, (preferably not too thick) can be reactivated by passing the gases over one or both sides of the cakes; for example by disposing a plurality of cakes, either upright or horizontally, on sieves in such a way that the gases can pass between the separate cakes.

It has also been found that the reactivation is complete and uniform throughout the entire mass, in the case of larger molded bodies, e. g. with a diameter of 8 millimetres and more. The process, which can also be employed with mixtures e. g. of powdered or fine-grained adsorption carbon and Fuller's earth, charcoal, wood pulp and the like, is conspicuous for simplicity, cheapness, reliability in operation and good results. It is therefore particularly suitable for the reactivation of adsorption carbon in the places where the same is used, e. g. sugar factories, oil refineries etc.

The actual reactivation proceeds, for example in the following way:—

After the powdered or fine-grained adsorption carbon has been transformed into molded bodies, these, or fragments thereof, are treated with gaseous mixtures having a low oxygen content. When suitable ranges of temperature are maintained the harmful adsorbed constituents are oxidized and eliminated by this simple process, without the active carbon being attacked to any noteworthy extent. The active carbon acts to some extent as a catalyst, promoting the combustion of the impurities by the oxygen, with easily removable and mainly volatile, products being formed. The reactivation treatment can be carried out with the molded adsorption carbon disposed as an absolutely undisturbed layer. When the process is continuous, the only movement is that of the whole mass, which proceeds at a rate corresponding to the velocity of progression of the reaction zone, in counter-current relation to the direction traversed by the gas mixture, any relative displacement of the separate particles of carbon being, as far as possible, avoided.

The oxygen concentrations used, the rate of flow of the gases, the temperature prevailing in the interior of the carbon layer, and in certain cases, the temperature of the reactivating gases introduced, are essentially dependent on the kind of the active carbon itself and on the nature and quantity of the harmful impurities. Moreover, the oxygen concentrations and the temperatures are interdependent insofar that for example, higher oxygen concentrations necessitate lower temperatures, and vice versa.

In general it has proved advisable to work with gas mixtures containing less than 8% of oxygen by volume, for example 2–8% by volume. Mixtures of air and steam, with or without admixture of other gases (such as gases of combustion) have proved, inter alia, suitable for carrying out the process.

The reactivation can be carried out in simple apparatus, and at ordinary, increased or reduced pressure, the oxygen concentration and temperature being adjusted to the pressure conditions. The adsorption charcoal is preferably disposed in the apparatus so that it fills the whole or the greater part of the cross sectional area thereof, since, under these conditions, the heat set free is confined in a narrow space and utilized to the greatest possible extent.

The process can be put into execution, for example by disposing the molded carbon, which is to be reactivated, in a simple container protected against heat loss by radiation, and treating it (for instance in the upward direction) with reactivating gases containing oxygen.

As soon as oxidation begins at the point of entry, the interior temperature of the carbon layer rises spontaneously, owing to the strongly exothermic oxidation set up. The free oxygen content of the admitted gases can then be adjusted in such a way that, generally speaking, only the harmful impurities are eliminated by oxidation, without the adsorption carbon itself being attacked to any noteworthy extent. It has been unexpectedly found that in most cases, even exceedingly low temperatures are sufficient to start the reaction process. If, for example superheated steam at only 180° C. is admitted, and if about 20% of air by volume be added to the steam after the temperature at the point of entry has risen to approximately the same level, vigorous oxidation of the impurities sets in forthwith, accompanied by a rapid rise of temperature in the interior of the bed of carbon. A reaction zone of relatively high temperature e. g. 500–600° C. is formed in the carbon layer, and progresses in the direction of flow of the gases. In proportion as the impurities are gradually oxidized the temperature gradually falls again at a definite point in the reaction zone. The carbon already reactivated is thereby cooled, by heat exchange with the flowing gases, while the carbon situated in front of the reaction zone is preheated to reaction temperature by the hot gases of combustion, a considerable portion of the impurities being thus already removed by thermal decomposition. At the close of the reactivation, the temperature throughout the carbon layer automatically falls again to the temperature of the admitted gases.

For the purpose of initiating the reactivating action the carbon may also be first preheated, with the aid of air for example to near the ignition temperature, the steam or other diluting gases being admitted only after this has been done.

In reactivating carbons in which oxidation does not commence at low temperatures, the adsorption carbon may, for example be disposed over an under layer of readily oxidizable substances, e. g. carbon impregnated with substances of very low ignition temperature; or that portion of the substance under treatment, which is adjacent to the gas inlet may be impregnated with such substances.

During the whole duration of the reactivation action, the temperature of the admitted gases need not exceed the temperature at which oxidation of the contaminated carbon begins. The temperature may even be further reduced after reactivation has commenced e. g. by using a mixture of steam and air at the temperature at which the steam begins to condense. When for example, mixtures of air and carbon dioxide are employed, the temperature may even be reduced to normal level, so that, apart from the initiation of the reactivation process, the entire calorific requirements can be supplied by the oxidation of the impurities present in the carbon.

The reactivation gases may, of course also be preheated to considerably higher temperatures e. g. to 250–400°; but the exothermic development of heat inside the carbon layer must then be moderated to a degree which does not exceed the temperature at which the carbon itself begins to be attacked. In general, for economic reasons, the content of free oxygen is kept as high as possible, and the temperature of the admitted gases as low as possible.

The reactivation process can easily be rendered continuous, for example, by removing the reactivated carbon from below and adding new carbon to be reactivated from above, at a rate corresponding to the velocity of progression of the reaction zone.

In many cases it has proved highly advantageous to subject the active carbon, under treatment to a preliminary purification by treatment with suitable solvents, capable of dissolving out a portion of the impurities from the active carbon.

If the harmful constituents consist in part of inorganic substances which cannot be transformed by oxidation into volatile compounds, treatment with acids or alkalis followed by washing with water, prior to or subsequent to the actual reactivation process, is advantageous.

The herein-described new process for the reactivation of contaminated powdered or fine-grained adsorption carbon constitutes an important technical improvement by comparison with the processes previously known, said improvement consisting substantially in that the reactivation can be carried out in simple apparatus with a very small expenditure of heat energy. This is rendered possible, on the one hand, by the arrangement of the molded material under treatment in compact masses, and on the other by the use of gas mixtures containing free oxygen, so that the heat energy set free by the exothermic reactivation process, is confined in as narrow a space as possible, and consequently

Example 1

Powdered active charcoal exhausted in purifying sugar juices, was thoroughly washed on a filter with water, then with hydrochloric acid until a marked acid reaction was obtained, and then with water again until the acid reaction of the washings was merely faint. The material was molded in an extrusion press while still moist. After a brief drying, the molded bodies were placed in a container lined with firebrick, and preheated by a blast of hot air. When the hot air at the inlet point had reached a temperature of about 80° C., the oxidation of the harmful constituents began, accompanied by a rapid rise of temperature. Steam was then mixed with the air, in such quantity that the air content amounted to about 10–12% by volume (corresponding to about 2% of free oxygen). The temperature inside the carbon layer rose spontaneously to about 430° C. The temperature of the entering mixture of steam and air was maintained at about 130° C. The temperature drop occurring after the oxidation and removal of the harmful constituents indicated the gradual termination of the reactivation process. The carbon had entirely regained its original decolorizing properties. The loss in weight of actual carbon was less than 5%.

Example 2

A mixture consisting of equal proportions of kieselguhr and decolorizing carbon, which had been used for decolorizing sugar syrup, was preliminarily treated with acid and water in the manner described in Example 1, and after being molded was charged into the reactivation apparatus. Superheated steam was blown in until the temperature had risen to about 160° C., at the steam inlet, and oxidation was then started by the addition of about 25% of air by volume. In the further course of the process, the air content was diminished to 18% and the temperature of the incident mixture of steam and air was reduced to 90–100° C. A temperature of 550–600° C. was attained in the reaction zone. The original decolorizing power of the carbon-kieselguhr mixture was regained.

Example 3

Decolorizing carbon, which had been used for the purification of vegetable oils, was extracted with benzine and after removing the latter by evaporation was mixed with potato flour (potato starch) paste, in the proportion of about 1.5 kg. of potato flour to 100 kg. of dry carbon. After the mass had been brought to the necessary degree of dryness, the molding and further reactivation treatment was carried out in a manner analogous to that of Example 2.

I claim:—

1. A process for the revivification of spent powdered active carbon which comprises molding the spent carbon into shapes without binding agents, and subjecting the molded carbon without agitation to the action of a gas mixture containing free oxygen in an amount not exceeding 8% by volume and having a temperature not exceeding 350°, the proportion of free oxygen and the temperature of the gas being so adjusted that the adsorbed impurities are removed with substantially no oxidation of the active carbon.

2. A process according to claim 1, according to which mixtures of air and steam are used as the treatment gases.

3. A process according to claim 1, characterized in that the gas mixture containing oxygen is admitted at temperatures between 120 and 250° C.

4. A process according to claim 1, characterized in that the carbon to be revivified is preheated at the gas inlet to temperatures at which oxidation by means of oxygen sets in and the action is carried on by admitting gas mixtures containing oxygen, the temperature of the mass being kept within the desired limits by regulating the addition of oxygen.

5. Process according to claim 1, characterized in that the carbon mass to be revivified is preheated by the action of a current of superheated steam, the temperature being then brought to and maintained at the desired level by admixing a gas containing oxygen with the admitted steam.

6. Process according to claim 1, characterized in that the carbon mass to be revivified is preheated with hot air and that steam is thereupon introduced.

7. Process according to claim 1, characterized in that substances of low ignition temperature are provided at the gas inlet.

In testimony whereof I affix my signature.

ANTON MACKERT.